(12) United States Patent
Jackson

(10) Patent No.: US 6,269,683 B1
(45) Date of Patent: Aug. 7, 2001

(54) SYSTEM AND METHOD FOR PRESSURE TESTING THE FITTINGS AND SEALS ASSOCIATED WITH THE COMMUNICATION LINES OF A WELL TOOL

(75) Inventor: Stephen L. Jackson, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/420,013

(22) Filed: Oct. 18, 1999

(51) Int. Cl.[7] .............................. G01M 3/28; F16L 15/04; E21B 47/00
(52) U.S. Cl. .......................... 73/40.5 R; 73/46; 73/49.1; 73/152.01; 73/152.36; 166/373; 285/93
(58) Field of Search .......................... 73/37, 40, 40.5 R, 73/46, 49.1, 49.8, 152.36, 152.01, 152.51; 166/373, 241.5, 242.2; 285/93, 351

(56) References Cited

U.S. PATENT DOCUMENTS

| | | |
|---|---|---|
| 2,956,823 | 10/1960 | Benjamin, Jr. et al. . |
| 3,141,685 * | 7/1964 | Watts ........................................ 285/93 |
| 3,333,459 * | 8/1967 | Claycomb ........................... 73/40.5 R |
| 3,695,642 | 10/1972 | De Woody . |
| 4,132,111 * | 1/1979 | Hasah ........................................ 73/46 |
| 4,152,924 * | 5/1979 | Mayo ................................... 73/40.5 R |
| 4,154,302 * | 5/1979 | Cugini ................................... 166/378 |
| 4,281,679 | 8/1981 | Stearns . |
| 4,373,380 * | 2/1983 | Mayo ................................... 73/40.5 R |
| 4,553,776 | 11/1985 | Dodd . |
| 4,712,813 | 12/1987 | Passerell et al. . |
| 4,716,962 * | 1/1988 | Rundell ................................. 166/84.1 |
| 4,744,421 * | 5/1988 | Wood et al. ........................... 166/387 |
| 4,832,381 * | 5/1989 | Boulton ................................. 285/338 |
| 5,314,209 | 5/1994 | Kuhne . |
| 5,577,556 * | 11/1996 | Reed ..................................... 166/88.1 |
| 6,056,327 | 5/2000 | Bouldin et al. . |

FOREIGN PATENT DOCUMENTS

3931340 * 12/1990 (DE) .

* cited by examiner

Primary Examiner—Daniel S. Larkin
Assistant Examiner—Michael Cygan
(74) Attorney, Agent, or Firm—Jeffrey Griffin; Jaime Castano

(57) ABSTRACT

A system for pressure testing the seals and fittings associated with at least one communication line passing through a well tool mandrel, each communication line housed within a communication line conduit defined through the well tool and sealingly engaged to each end of its corresponding communication line conduit by way of a fitting and the fittings also sealingly engaged to the communication line conduit. The system generally comprises a testing conduit, a testing passageway system, and a testing plug. The testing conduit is defined in the well tool mandrel. The testing passageway system is defined in the well tool mandrel and provides fluid communication between the testing conduit and the fittings and seals associated with each of the communication line conduits. The testing plug provides fluid communication between a pressure testing source and the testing passageway system. A pressure source is operatively connected to the testing plug, and pressurized fluid is guided from the testing plug, through the testing passageway system, into the communication line conduits, and into contact with the with the fittings and seals associated with each of the communication line conduits. Any leaks discovered as a result of this pressurization indicate the presence of a faulty engagement of the fittings or seals associated with the communication line conduits. This operation is performed prior to inserting the well tool in the well bore and without the pressurization of the well tool internal bore.

38 Claims, 6 Drawing Sheets

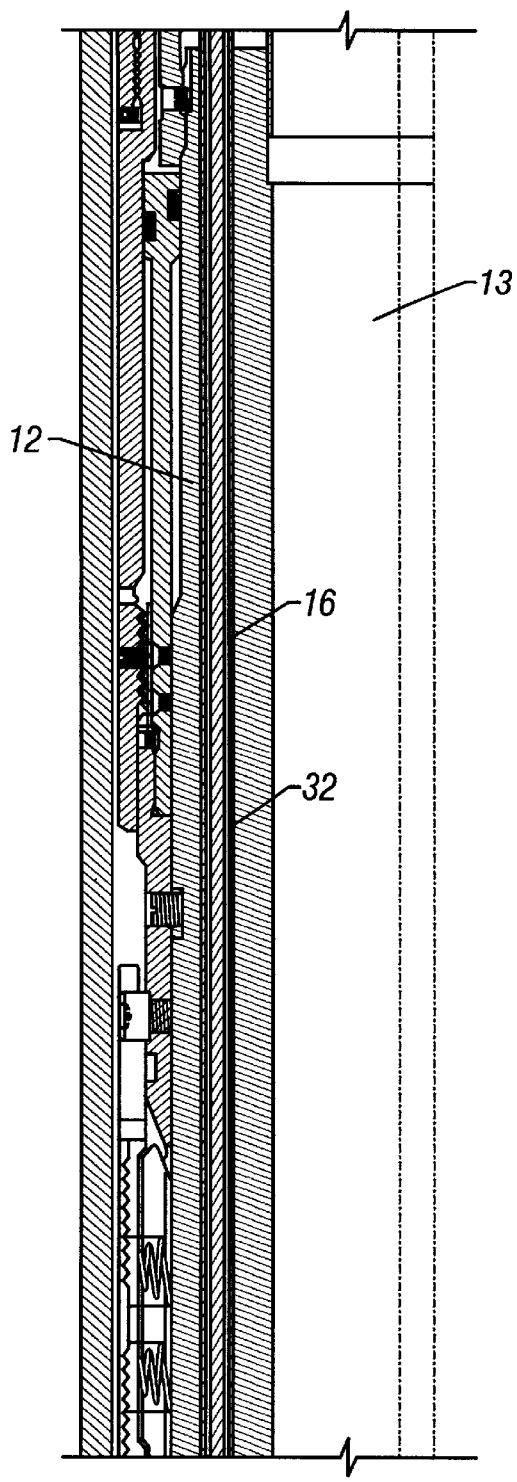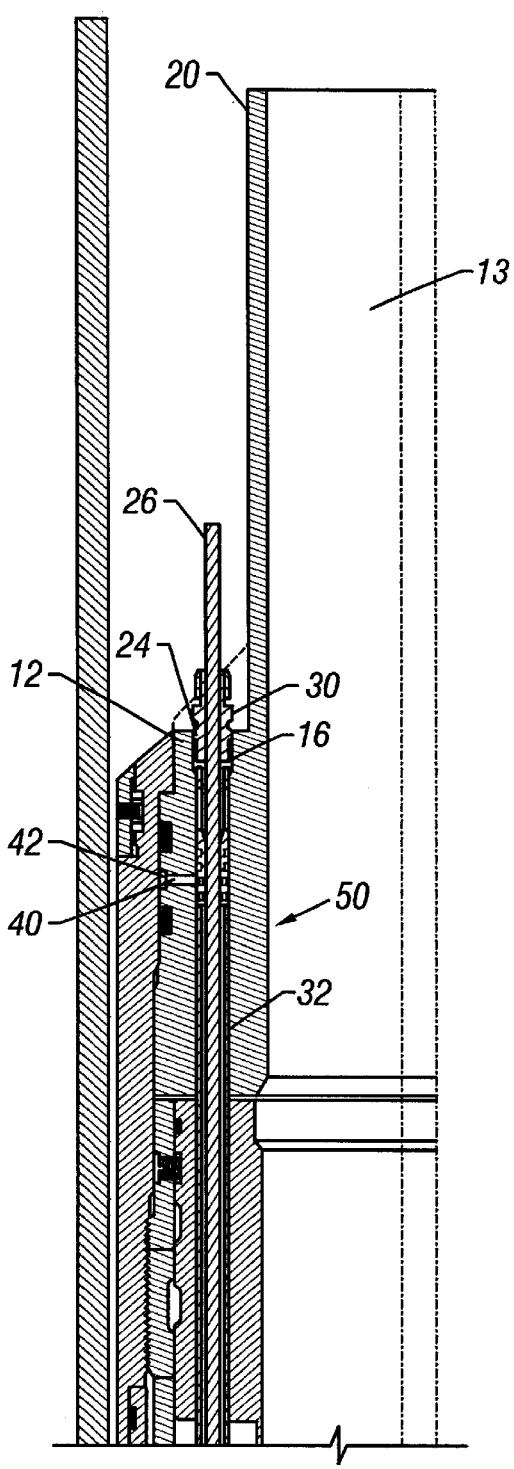
*FIG. 1C*     *FIG. 1D*

SYSTEM AND METHOD FOR PRESSURE TESTING THE FITTINGS AND SEALS ASSOCIATED WITH THE COMMUNICATION LINES OF A WELL TOOL

BACKGROUND OF THE INVENTION

1. Field of Invention

The present invention relates to the field of downhole tool testing. More specifically, the invention relates to a system and method for pressure testing the fittings and seals associated with the lines or cables disposed through a well tool prior to insertion of the tool downhole and without the need to pressurize the tubing bore.

2. Related Art

It is sometimes necessary to pass and connect lines or cables through conduits defined in a well tool. Such lines or cables may include control lines, permanent downhole cables, permanent encapsulated cables, fiber optic lines, or chemical injection lines (hereinafter referred to as "communication lines"). The communication lines provide fluid, hydraulic, chemical, or electrical communication between elements above the well tool and elements beneath the well tool. In order to properly connect the communication lines, fittings and seals are disposed at least on the upper and lower ends of the conduits. The fittings and seals provide the sealing connection between the communication lines and the conduits so that the integrity of the communication lines is maintained throughout their entire lengths from their source to their downhole destination.

It is imporant to test the integrity of the communication line fittings and seals to ensure their proper operation. The testing of communication line fittings and seals is normally performed by pressurizing specific channels associated with the relevant communication line, connecting a gauge to one end of the communication line, and observing for any depressurization in the gauge which would indicate the existence of a leak. It would thus be beneficial to the prior art to provide a system and method to perform such testing.

Pressure testing the seals and fittings associated with a communication line becomes more intricate if the well tool carrying the communication line also includes settable elements (such as the seal elements in packers). In these cases, the pressurization of the specific channels associated with the relevant communication line must be achieved without prematurely setting the settable elements associated with the tool. It would therefore be beneficial to the prior art to provide a system and method for testing a tool's communication line fittings and seals that does not cause the premature setting of any elements associated with the tool.

In addition, once the well tool is placed in the downhole environment, the testing of associated communication line seals and fittings is complicated. An easier and more practical approach would be to conduct the test of the communication line seals and fittings at the surface of the well prior to inserting the tool downhole. The prior art would therefore benefit from a system and method for testing a tool's communication line fittings and seals at the surface of the well prior to the insertion of the tool in the well.

It is also more complicated to conduct tests that require the pressurization of the tubing bore of the well tool. Pressurizing the tubing bore requires seals on both ends of the well tool as well as relatively more powerful pressure supply equipment. It would therefore be beneficial to the prior art to provide a system and method for testing a tool's communication line fittings and seals that does not require the pressurization of the tubing bore of the tool.

SUMMARY OF THE INVENTION

It is therefore an objective of the present invention to provide a system and method that:

- enables the testing of a tool's communication line fittings and seals;
- may be utilized in a substantial number of types of well tools;
- enables such testing to be performed without prematurely setting any elements associated with the tool;
- enables such testing to be performed at the surface of the well prior to the insertion of the tool inside the wellbore;
- does not require the pressurization of the tubing bore of the tool; and
- allows communication between the conduits which house the communication lines and the tubing bore thereby preventing the formation of atmospheric chambers.

Other objectives of the present invention will be obvious by reading the specification and claims appended hereto.

To achieve such objectives, my invention is a system for pressure testing the seals and fittings associated with at least one communication line passing through a well tool mandrel, each communication line housed within a communication line conduit defined through the well tool and sealingly engaged to each end of its corresponding communication line conduit by way of a fitting and the fittings also sealingly engaged to the communication line conduit. The system generally comprises a testing conduit, a testing passageway system, and a testing plug. The testing conduit is defined in the well tool mandrel. The testing passageway system is defined in the well tool mandrel and provides fluid communication between the testing conduit and the fittings and seals associated with each of the communication line conduits. The testing plug provides fluid communication between a pressure testing source and the testing passageway system. A pressure source is operatively connected to the testing plug, and pressurized fluid is guided from the testing plug, through the testing passageway system, into the communication line conduits, and into contact with the with the fittings and seals associated with each of the communication line conduits. Any leaks discovered as a result of this pressurization indicate the presence of a faulty engagement of the fittings or seals associated with the communication line conduits. This operation is performed prior to inserting the well tool in the well bore and without the pressurization of the well tool internal bore.

The operation of my testing system also provides an inventive method to conduct such pressure testing, the method comprising providing a testing conduit and a testing passageway system in the well tool mandrel, the testing passageway system providing fluid communication between the testing conduit and the fittings and seals associated with each of the communication line conduits; and injecting pressurized fluid from a pressure testing source, through the testing conduit, through the testing passageway system, into each communication line conduit, and into contact with the fittings and seals associated with each of the communication line conduits.

BRIEF DESCRIPTION OF THE DRAWINGS

FIGS. 1A–1D are a partial longitudinal cross-sectional view of a well tool (packer) that includes the testing system.

DETAILED DESCRIPTION OF THE INVENTION

Figure 1A:
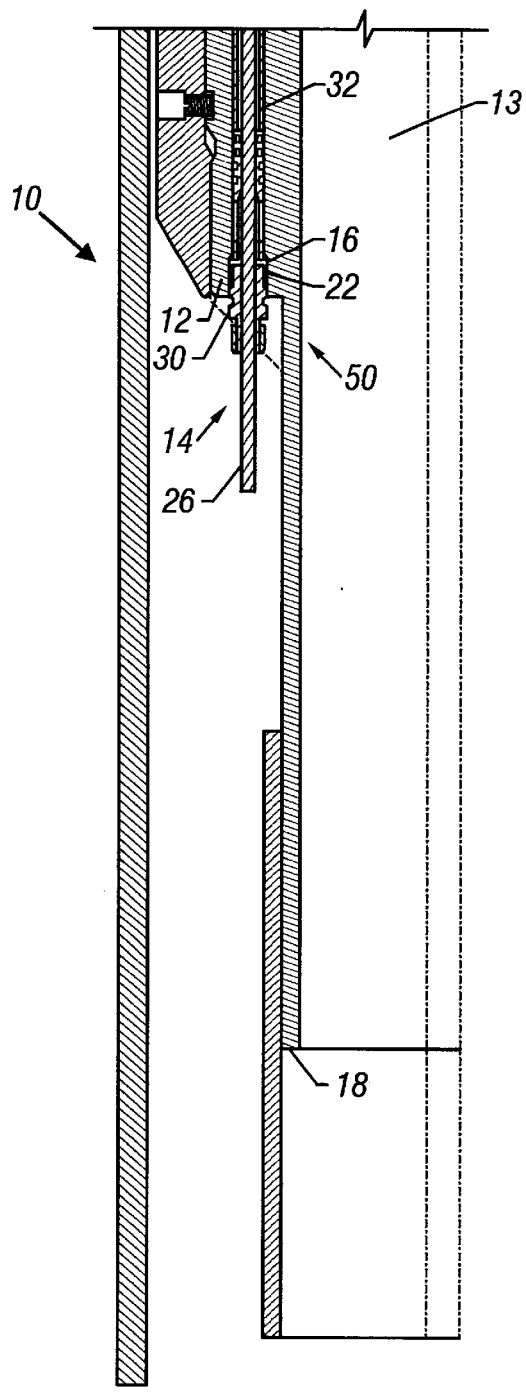
Figure 1B:
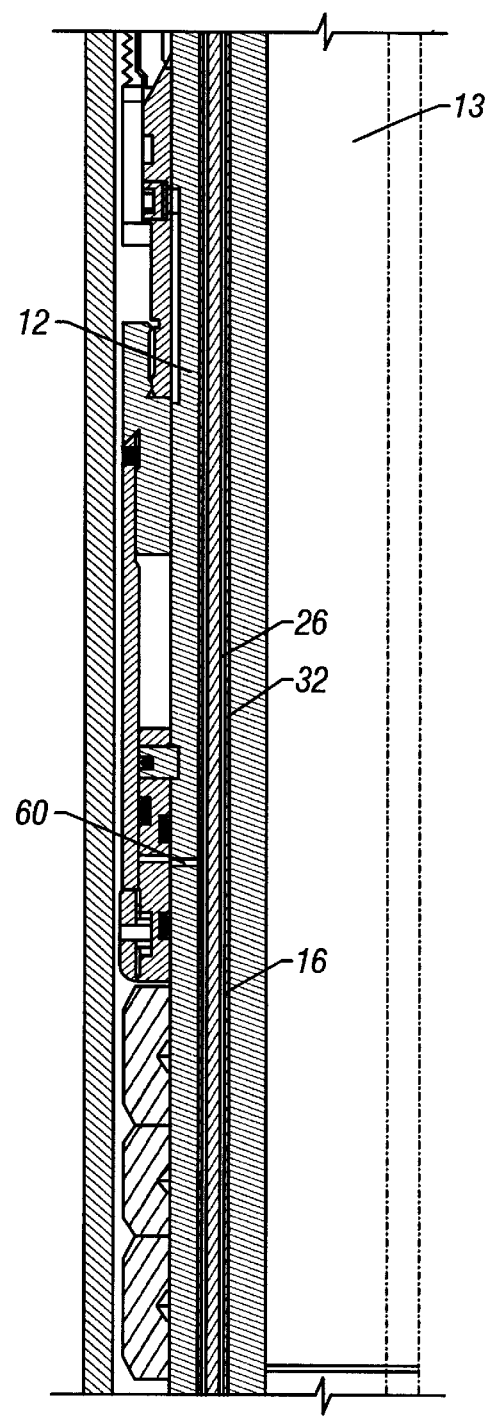

The testing system of this invention is shown generally in FIGS. 1–6 as 10. As best seen in FIGS. 1A–1D, the testing system 10 is situated on the mandrel 12 of a well tool 14 having an internal bore 13. Although the well tool 14 illustrated in the Figures is a packer, it is understood that the testing system 10 may be included in any tool with a mandrel 12 that requires communication lines to be passed therethrough. The testing system 10 is, however, particularly useful with packers, as will be disclosed herein.

The well tool 14 includes at least one communication line conduit 16 axially defined in the mandrel 12 from the mandrel first end 18 to the mandrel second end 20. A conduit first end 22 is defined at the mandrel first end 18, and a conduit second end 24 is defined at the mandrel second end 20. A conduit tubing 32 is provided within each conduit 16. Preferably, the conduit tubing 32 extends from a position proximate the conduit first end 22 to a position proximate the conduit second end 24. A communication line 26 is passed completely through the conduit 16 and within the conduit tubing 32. Communication line 26 is typically operatively connected and extends to equipment above and below the well tool 14. As previously disclosed, it is understood that communication line 26 may comprise any of a variety of lines or cables, including control lines, permanent downhole cables, permanent encapsulated cables, fiber optic lines, or chemical injection lines.

Figure 2:
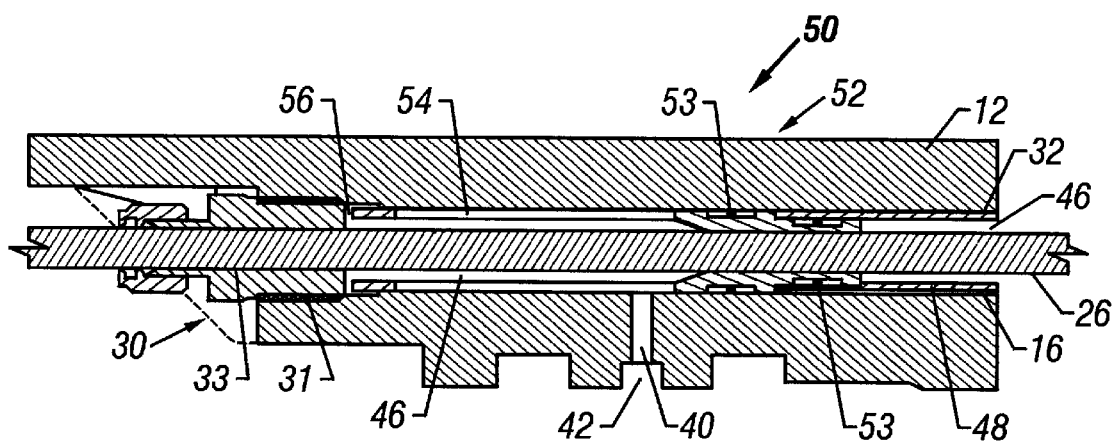
FIG. 2 is an enlarged view of one end of a communication line conduit illustrating the connections between the communication line conduit, the communication line, the conduit tubing, the fitting, and the bypass component.

Turning to FIGS. 1A, 1D, and 2, at each of its ends and within its respective conduit 16, each conduit tubing 32 is connected to a bypass component 50. Bypass component 50 is preferably generally tubular and generally maintains the axial profile of the conduit tubing 32. Each communication line 26 extends through its two corresponding bypass components 50. Bypass component 50 includes a sealing mechanism 52 that comprises at least two seals 53, one seal 53 providing a sealing engagement between the bypass component 50 and the conduit tubing 32 and the other seal 53 providing a sealing engagement between the bypass component 50 and the conduit 16. The bypass component 50 that is proximate one end, 18 or 20, of the mandrel, preferably the mandrel second end 20, also includes at least one slot 54. The slot 54 is in fluid communication with, and is preferably radially adjacent to, a conduit port 40, as will be disclosed herein. A fitting 30 is threadably sealably engaged on its outer surface 31 to each conduit 16 at each of the conduit first end 22 and the conduit second end 24. Each fitting 30 is proximate a bypass component 50 with a gap 56 axially defined therebetween. The communication line 26 is communicated through the inner surface 33 of each fitting 30 and is sealably engaged thereto. The seals associated with each fitting 30 are therefore the sealing engagement between the fitting outer surface 31 and the conduit 16 and the sealing engagement between the fitting inner surface 33 and the communication line 26.

As best shown in FIG. 2, two spaces, each preferably annular in shape, are defined by the interrelation between the conduit 16, the conduit tubing 32, the communication line 26, the bypass component 50, and the fittings 30. A first space 46 is generally defined in the radial direction between the communication line 26 and the conduit tubing 32. First space 46 extends longitudinally between the fittings 30. A second space 48 is generally defined in the radial direction between the conduit tubing 32 and the conduit 16. Second space 48 extends longitudinally between the bypass components 50, specifically between the seals 53 sealing the bypass components 50 to the conduit 16.

Figure 3:
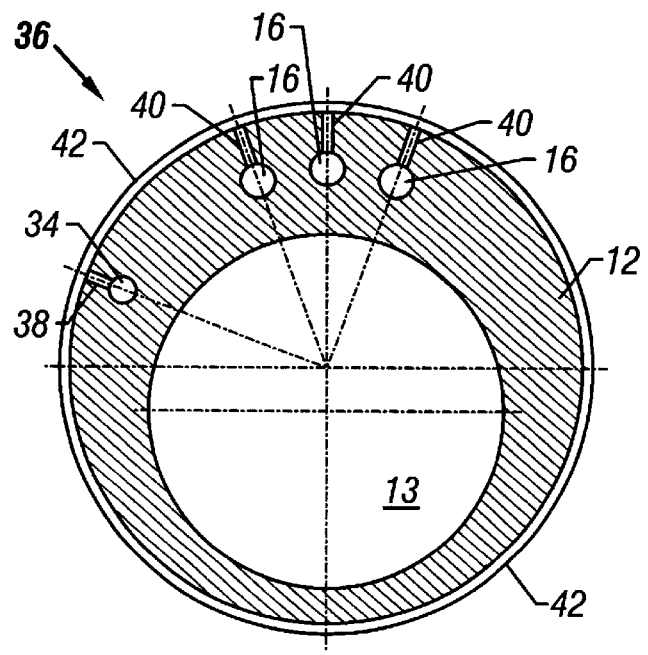
FIG. 3 is a cross-sectional view taken along line 3—3 of FIG. 4, illustrating the fluid communication between the communication line conduits, the testing passageway system, and the testing conduit.
Figure 4:
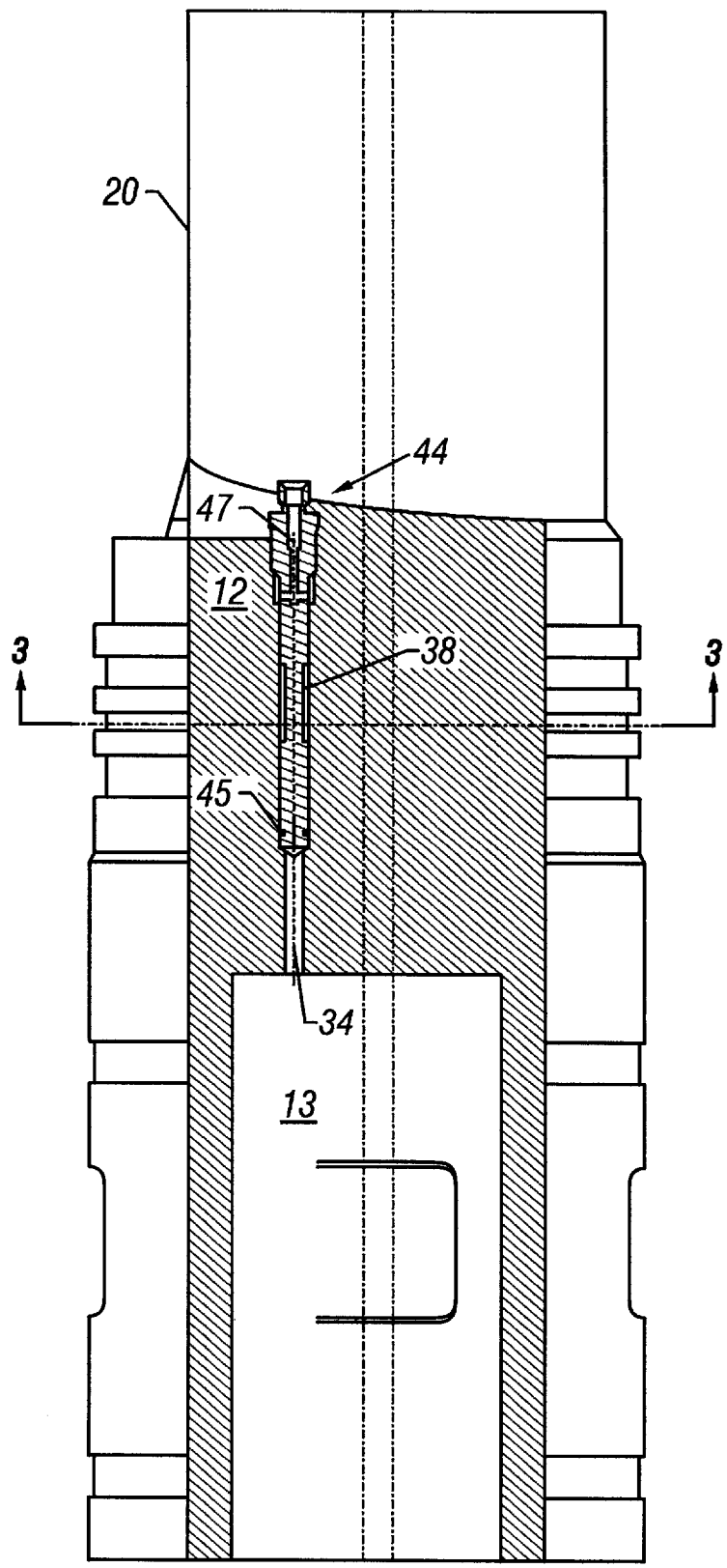
FIG. 4 is a partial longitudinal cross-sectional view of the well tool illustrating the connection between the testing plug and the testing conduit.
Figure 5:
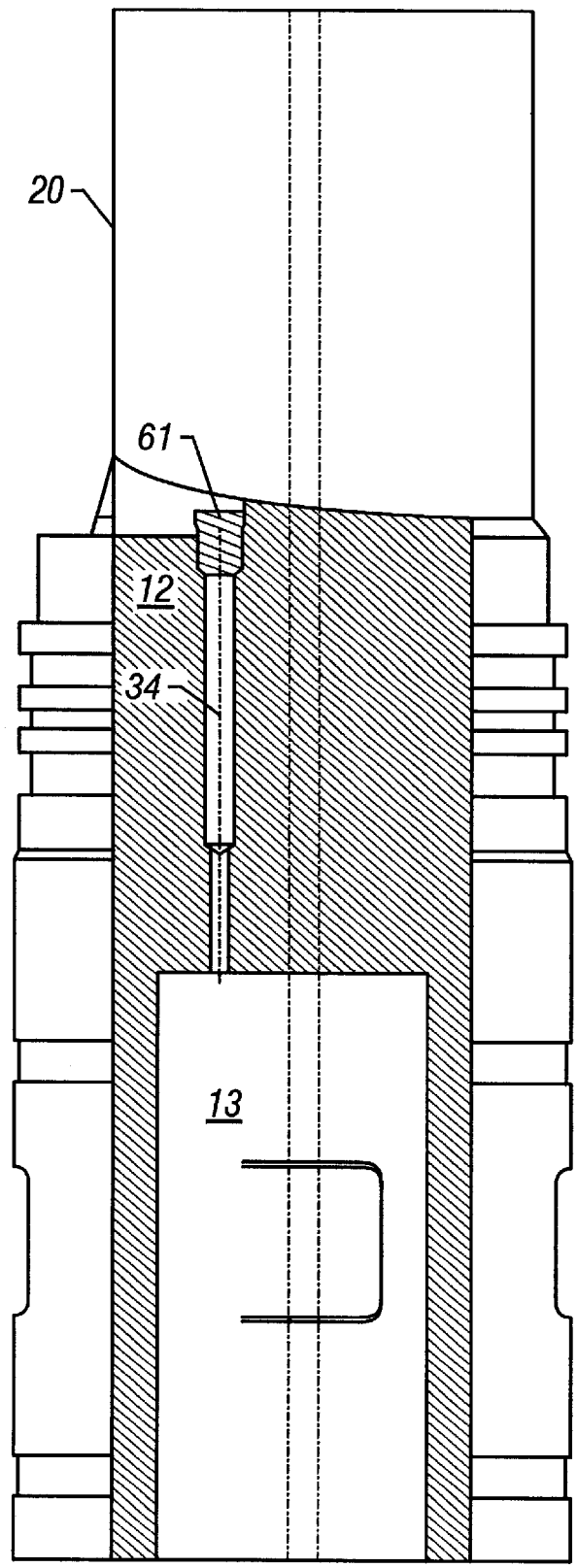
FIG. 5 is a partial longitudinal cross-sectional view of the well tool illustrating the connection between the standard plug and the testing conduit.
Figure 6:
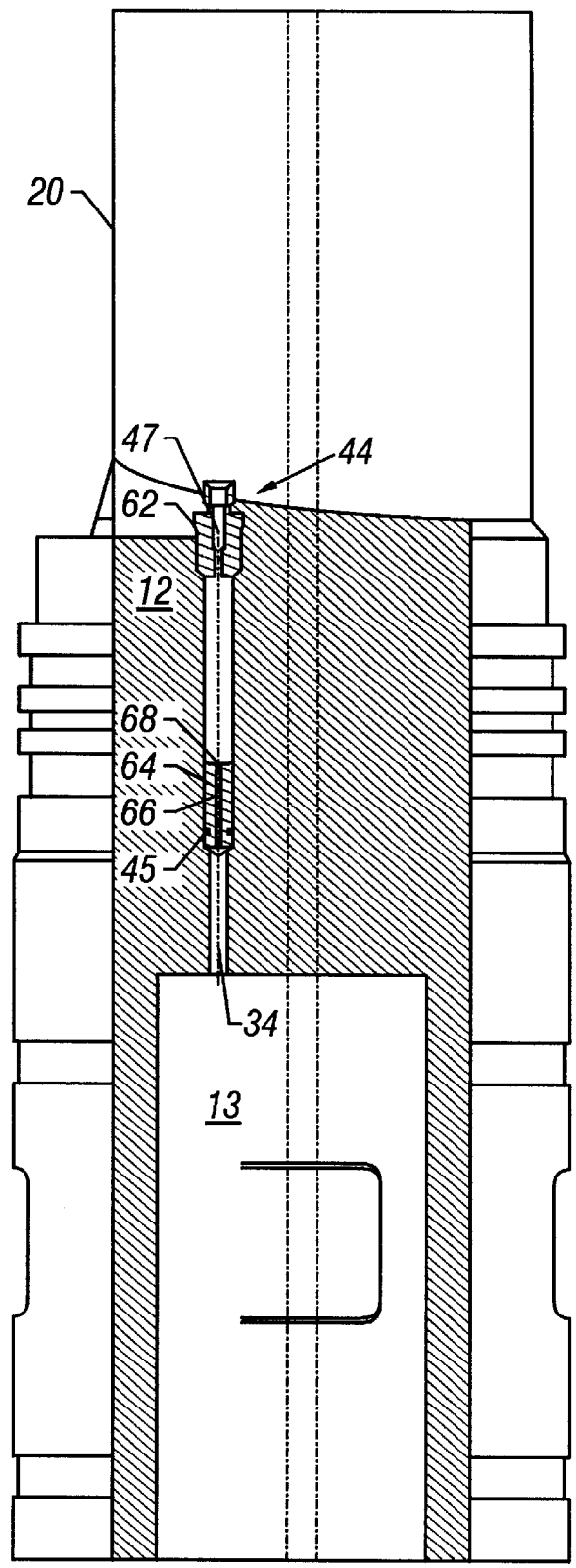
FIG. 6 is a partial longitudinal cross-sectional view of the well tool illustrating the connection of the first testing plug piece and the rupture disk in the testing conduit.

As shown in FIGS. 3, 4 and 6, testing system 10 also comprises a testing conduit 34, a testing passageway system 36, and a testing plug 44. Testing conduit 34 is axially defined in the mandrel 12 from one of the mandrel ends, 18 or 20, to the well tool bore 13. Preferably, testing conduit 34 extends through the mandrel 12 from the mandrel second end 20 to the well tool bore 13. Testing passageway system 36 provides fluid communication between the testing conduit 34 and each of the conduits 16, specifically the first space 46 of each conduit 16.

In the preferred embodiment, testing passageway system 36 comprises a testing conduit inlet 38 associated with the testing conduit 34, a conduit port 40 associated with each conduit 16, and a testing duct 42 providing fluid communication between the testing conduit inlet 38 and each conduit port 40. Preferably, the testing duct 42 is an annular duct defined within the mandrel 12, the testing conduit inlet 38 extends radially from the testing conduit 34 to the testing duct 42, and each of the conduit ports 40 extend radially from their respective communication line conduits 16 to the testing duct 42.

Testing plug 44 threadably sealably engages to the testing conduit 34 at the relevant mandrel end, 18 or 20. Testing plug 44 is operatively connected to a pressure testing source (not shown) and provides fluid communication by way of a testing plug passageway 47 between the pressure testing source and the testing passageway system 36 (specifically testing conduit inlet 38). Testing plug 44, however, prohibits fluid communication between the pressure testing source and the well tool bore 13 by way of a seal 45 sealingly engaging the testing conduit 34 and placed intermediate the testing passageway system 36 (testing conduit inlet 38) and the well tool bore 13.

In the preferred embodiment as shown in FIGS. 3 and 4, testing plug 44 extends from the relevant mandrel end, 18 or 20, past the junction between the testing conduit inlet 38 and the testing conduit 34. The testing plug passageway 47 preferably extends from the relevant mandrel end, 18 or 20, to the testing conduit inlet 38.

In an alternative embodiment as shown in FIG. 6, testing plug 44 comprises a first testing plug piece 62 and a rupture disk 64. First testing plug piece 62 is threadably sealably engaged to the testing conduit 34 at the relevant mandrel end, 18 or 20. First testing plug piece 62 is operatively connected to a pressure testing source (not shown) and provides fluid communication by way of a testing plug passageway 47 between the pressure testing source and the testing passageway system 36 (specifically the testing conduit inlet 38). First testing plug piece 62 extends from the relevant mandrel end, 18 or 20, to a location intermediate the relevant mandrel end, 18 or 20, and the junction between the testing conduit inlet 38 and the testing conduit 34. Rupture disk 64 initially prohibits fluid communication between the pressure testing source and the well tool bore 13 and is securely placed intermediate the testing passageway system 36 (testing conduit inlet 38) and the well tool bore 13. Rupture disk 64 includes a seal 45 sealingly engaging the testing conduit 34. Rupture disk 64 also includes a rupture disk passageway 66 that is initially blocked by a disk 68. As is well-known in the art, disk 68 is rated to rupture at a certain pre-determined pressure thereafter leaving the rupture disk passageway 66 unblocked and allowing fluid communication between the well tool bore 13 and the testing passageway system 36.

In Operation

Prior to introduction of the tool 14 into the wellbore but after inserting the communication lines 26 through the tool 14 (as previously disclosed), an operator first ensures that the testing plug 44 is correctly sealably engaged to the relevant mandrel end, 18 or 20. The pressure supply is next activated, which injects fluid pressure into the testing plug passageway 47. The fluid pressure is prohibited from reaching the tool bore 13 side of the testing conduit 34 by the seal 45. The fluid pressure is thus forced to travel from the testing plug passageway 47 through the testing conduit inlet 38 and into the testing duct 42. Within the testing duct 42, the fluid pressure follows the annular profile of the testing duct 42 until it reaches the conduit ports 40.

The fluid pressure then enters each conduit port 40 and flows through the relevant bypass component slot 54 into the first space 46 defined between the communication line 26 and the conduit 16. Within the first space 46, the fluid pressure extends in both directions longitudinally along the outer surface of the communication line 26. Note that the bypass component 50 does not seal against the communication line 26 thereby allowing the flow of pressurized fluid longitudinally therebetween and along the communication line 26. However, due to the presence of the seals 53 which seal the bypass components 50 to the conduit 16, the fluid pressure does not enter the second space 48. The fluid pressure extends in the first space 46 through the gaps 56 and toward each fitting 30 until reaching the sealing engagement between the inner surface 31 of the fittings 30 and the communication line 26 and the sealing engagement between the outer surface 33 of the fittings 30 and the conduit 16. Full pressurization of the testing system 10 has been achieved at this point.

Particularly for well tools 14 that are packers, it is important to note that the pressurized fluid does not enter the second space 48. The second space 48 is in fluid communication with the setting ports 60 of the well tool 14. Thus, if pressurized fluid were to enter the second space 48, the fluid would also pass into the setting ports 60, and depending on the pressure of the fluid, the fluid may cause the settable elements (such as sealing elements) of the well tool 14 to prematurely set. Of course, such an occurrence is not desired.

The operator then observes any depressurization in the pressure gauge attached to the pressure supply in order to detect the presence of any leaks in the system. If the operator does not notice any decrease in pressure, then the communication lines 26 and their associated fittings and seals are satisfactorily sealingly engaged. However, if the operator does notice a decrease in pressure, then this signifies either the presence of a leak somewhere in the communication line 26 system, perhaps at the fittings 30 or at the bypass components 50, or the presence of a leak at the testing plug seal 45. In either respect, the well tool 14 is not ready for insertion into the wellbore, and the communication line 26 sealing system must be checked and fixed. The testing procedure is then repeated until a satisfactory test result, as defined above, is achieved.

In the embodiment in which testing plug 44 comprises one integral piece as shown in FIGS. 3 and 4, once a satisfactory test result is achieved, the testing system 10 is deactivated and depressurized, and the testing plug 44 is wholly removed from the testing conduit 34. A standard plug 61 is then inserted in its place prior to inserting the well tool 14 downhole. Importantly, the standard plug 61 allows fluid communication between the tool bore 13 and the testing conduit inlet 38 through the testing conduit 42. The standard plug 61, however, seals against mandrel second end 20 preventing fluid communication from testing conduit 34 through mandrel second end 20 and into the tool exterior.

In the embodiment in which testing plug 44 comprises a first testing plug piece 62 and a rupture disk 64, once a satisfactory test result is achieved, the pressure testing source is activated to pressurize the testing system 10 above the pressure rating of the disk 68 thereby rupturing disk 68 and allowing fluid communication between the well tool bore 13 and the testing passageway system 36. First testing plug piece 62 is then removed from the testing conduit 34, and a standard plug 61 is inserted in its place prior to running the well tool 14 downhole (not shown with rupture disk 64 but similar to that of FIG. 5). Importantly, the standard plug 61 allows fluid communication between the tool bore 13 and the testing conduit inlet 38 through the testing conduit 34. The standard plug 61, however, seals against mandrel second end 20 preventing fluid communication from testing conduit 34 through mandrel second end 20 and into the tool exterior.

Because the testing conduit inlet 38 is in fluid communication with the first space 46, the tool bore 13 is then also in fluid communication with the first space 46 once the standard plug 61 has replaced the testing plug 44. This fluid communication enables whatever fluid is present in the tool bore 13 after the tool 14 is inserted downhole ("the downhole fluid") to flow into the first space 46. As is understood by those skilled in the art, the downhole fluid will also typically be present in the annulus of the wellbore and typically enters the second space 48 through the setting ports 60. Since the downhole fluid is present at either side of the conduit tubing 32 (within the first space 46 and within the second space 48), pressure is balanced across the conduit tubing 32 thereby ensuring that the communication line 26 does not rupture as a result of trapped pressure pockets once the well tool 14 is inserted downhole.

The operation of the testing system 10 thus provides an inventive method for pressure testing the seals and fittings 30 associated with at least one communication line 26 passing through a well tool 14, the method comprising: providing a testing conduit 34 and a testing passageway system 36 in the well tool mandrel 12, the testing passageway system 36 providing fluid communication between the testing conduit 34 and the fittings 30 and seals associated with each of the communication line conduits 16; and injecting pressurized fluid from a pressure testing source, through the testing conduit 34, through the testing passageway system 36, into each communication line conduit 16, and into contact with the fittings 30 and seals associated with each of the communication line conduits 16.

The method may further comprise, after the providing step and before the injecting step, inserting a testing plug 44 in the testing conduit 34, the testing plug 44 providing fluid communication between the pressure testing source and the testing passageway system 36. In addition, such method may also comprise, after the inserting step, replacing the testing plug 44 with a standard plug that prevents fluid communication between the testing conduit 34 and the well tool exterior but allows fluid communication between the well tool internal bore 13 and the testing conduit passageway 36.

The method may further comprise, after the injecting step, observing whether the reading on the gauge associated with the pressure testing source decreases thereby signifying the presence of a leak in the system. In addition, such method may also comprise, after the injecting step, preventing fluid communication between the testing conduit 34 and the well tool exterior but allowing fluid communication between the well tool internal bore 13 and the testing conduit passageway 36.

The method may further comprise sealingly dividing each communication line conduit 16 into a first space 46 and a second space 48, each first space 46 being in fluid communication with the testing conduit passageway 36 and with the fittings 30 and seals of its corresponding communication line 26, each second space 48 being in fluid communication with the setting ports 60 of the well tool 14; and preventing fluid communication between the first space 46 and the second space 48. In such method, the sealingly dividing step and the preventing fluid communication step may also comprise disposing a conduit tubing 32 in each communication line conduit 16 with the corresponding communication line 26 passing therethrough, the conduit tubing 32 being in sealing engagement with its corresponding communication line conduit 16 at each of its ends, the first space 46 generally defined in the radial direction between each communication line 26 and its corresponding conduit tubing 32, and the second space 48 generally defined in the radial direction between each conduit tubing 32 and its corresponding conduit 16. In addition, such method may also comprise, after the injecting step, balancing the pressure between the first space 46 and the second space 48.

It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims.

I claim:

1. A system for pressure testing the seals and fittings associated with at least one communication line passing through a well tool mandrel, each communication line housed within a communication line conduit defined through the well tool and sealingly engaged to each end of its corresponding communication line conduit by way of a fitting, the fittings also sealingly engaged to the communication line conduit, the system comprising:

a testing conduit defined in the well tool mandrel;

a conduit tubing provided in each communication line conduit;

each communication line passing within its corresponding conduit tubing;

a first space generally defined in the radial direction between each communication line and its corresponding conduit tubing;

the first space being in fluid communication with the fittings and seals of its corresponding communication line;

a second space generally defined in the radial direction between each conduit tubing and its corresponding communication line conduit;

at least one bypass component preventing fluid communication between the first space and the second space;

a testing passageway system providing fluid communication between the testing conduit and each of the first spaces; and a testing plug providing fluid communication between a pressure testing source and the testing passageway system.

2. The system of claim 1, wherein:

each of the communication line conduits is defined axially through the well tool mandrel from a mandrel first end to the mandrel second end; and the testing conduit is axially defined in the well tool mandrel from one of the mandrel ends to the well tool internal bore.

3. The system of claim 1, wherein the testing passageway system comprises:

a testing conduit inlet and a testing duct defined in the well tool mandrel;

a conduit port for each communication line conduit defined in the well tool mandrel;

the testing conduit inlet providing fluid communication between the testing conduit and the testing duct; and each conduit port providing fluid communication between the first annular space of its corresponding communication line conduit and the testing duct.

4. The system of claim 3, wherein:

each of the communication line conduits is axially defined through the well tool mandrel from a mandrel first end to the mandrel second end;

the testing conduit is axially defined in the well tool mandrel from one of the mandrel ends to the well tool internal bore;

the testing conduit inlet extends radially from the testing conduit to the testing duct;

the testing duct is an annular duct defined within the well tool mandrel; and each conduit port extends radially from its corresponding communication line conduit to the testing duct.

5. The system of claim 1, wherein:

the testing conduit is axially defined in the well tool mandrel from one of the mandrel ends to the well tool internal bore;

the testing plug is threadably sealably engaged to the testing conduit;

the testing plug includes a testing plug passageway therethrough providing fluid communication between the pressure testing source and the testing passageway system; and the testing plug includes a testing plug seal prohibiting fluid communication between the pressure testing source and the well tool internal bore.

6. The system of claim 5, wherein the testing plug seal is located intermediate the testing passageway system and the well tool internal bore and sealingly engages the testing conduit.

7. The system of claim 1, further comprising:

a bypass component disposed at each end of each conduit tubing;

each communication line extending through each corresponding bypass component; and each bypass component including a sealing mechanism that provides a sealing engagement between the bypass component and the conduit tubing and between the bypass component and the control line conduit.

8. The system of claim 7, wherein each bypass component includes at least one slot providing fluid communication between its corresponding conduit port and its corresponding first space.

9. The system of claim 8, wherein the bypass component slot is radially adjacent to its corresponding conduit port.

10. A method for pressure testing the seals and fittings associated with at least one communication line conduit included in a well tool mandrel, the method comprising:

injecting pressurized fluid from a pressure testing source, through a testing conduit in the well tool mandrel, through a testing passageway system in the well tool mandrel, into the at least one communication line conduit, and into contact with the fittings and seals associated with the at least one communication line conduit, the at least one communication line conduit associated with at least one communication line, the at least one communication line housed within the at least one communication line conduit and engaged to the at least one communication line conduit by way of at least one of the fittings;

sealingly dividing the at least one communication line conduit into a first space and a second space, the first space being in fluid communication with the testing passageway system and with the fittings and seals of the at least one communication line conduit, the second space being in fluid communication with setting ports of the well tool; and preventing fluid communication between the first space and the second space.

11. The method of claim 10, wherein the sealingly dividing step and the preventing fluid communication step comprise disposing a conduit tubing in each communication line conduit with the corresponding communication line passing therethrough, the conduit tubing being in sealing engagement with its corresponding communication line conduit at each of its ends, the first space generally defined in the radial direction between each communication line and its corresponding conduit tubing, and the second space generally defined in the radial direction between each conduit tubing and its corresponding conduit.

12. The method of claim 10, further comprising, after the injecting step, balancing the pressure between the first space and the second space.

13. A system for pressure testing a sealing engagement of fittings associated with at least one communication line disposed in a communication line conduit included in a well tool, the communication line conduit defined axially through the well tool, the system comprising:

a testing conduit defined in the well tool, the well tool adapted to be disposed inside a wellbore, wherein the testing conduit is axially defined in the well tool and extends to a well tool internal bore;

a testing passageway system defined in the well tool providing fluid communication between the testing conduit and at least one of the fittings associated with the at least one communication line; and a testing plug disposed in the testing conduit providing fluid communication between a pressure testing source and the testing passageway system.

14. The system of claim 13, wherein the testing passageway system comprises:

a testing conduit inlet and a testing duct defined in the well tool;

a conduit port for the communication line conduit defined in the well tool;

the testing conduit inlet providing fluid communication between the testing conduit and the testing duct; and the conduit port providing fluid communication between the communication line conduit and the testing duct.

15. The system of claim 13, wherein:

the testing conduit inlet extends radially from the testing conduit to the testing duct;

the testing duct is an annular duct defined within the well tool; and the conduit port extends radially from the communication line conduit to the testing duct.

16. A system for pressure testing a sealing engagement of fittings associated with at least one communication line disposed in a communication line conduit included in a well tool, the system comprising:

a testing conduit axially defined in the well tool, the testing conduit extending to a well tool internal bore, the well tool adapted to be disposed inside a wellbore;

a testing passageway system defined in the well tool providing fluid communication between the testing conduit and at least one of the fittings associated with the at least one communication line; and a testing plug disposed in the testing conduit providing fluid communication between a pressure testing source and the testing passageway system, wherein the testing plug is threadably sealably engaged to the testing conduit;

the testing plug includes a testing plug passageway therethrough providing fluid communication between the pressure testing source and the testing passageway system; and the testing plug includes a testing plug seal prohibiting fluid communication between the pressure testing source and the well tool internal bore.

17. The system of claim 16, wherein the testing plug seal is located intermediate the testing passageway system and the well tool internal bore and sealingly engages the testing conduit.

18. A system for pressure testing a sealing engagement of fittings associated with at least one communication line disposed in a communication line conduit included in a well tool, the system comprising:

a testing conduit defined in the well tool, the well tool adapted to be disposed inside a wellbore;

a testing passageway system defined in the well tool providing fluid communication between the testing conduit and at least one of the fittings associated with the at least one communication line;

a testing plug disposed in the testing conduit providing fluid communication between a pressure testing source and the testing passageway system;

a conduit tubing provided in the communication line conduit;

the at least one communication line passing within the conduit tubing; and being sealed to the communication line conduit proximate each of its ends.

19. The system of claim 18, wherein:
a first space is generally defined between the communication line and its corresponding conduit tubing;
the first space being in fluid communication with the fittings of the communication line;
a second space is generally defined between each conduit tubing and the conduit; and
the sealing engagements between the conduit tubing and its corresponding conduit preventing fluid communication between the first space and the second space.

20. The system of claim 18, further comprising:
a bypass component disposed at each end of the conduit tubing;
the communication line extending through the bypass component; and
the bypass component including a sealing mechanism that provides the sealing engagement between the bypass component and the conduit tubing and between the bypass component and the control line conduit.

21. The system of claim 21 wherein the first space is pressure balanced with the second space when the well tool is disposed in the wellbore.

22. A method for pressure testing a sealing engagement of fittings associated with at least one communication line disposed in a communication line conduit included in a well tool, the method comprising:
providing a testing conduit and a testing passageway system in the well tool, the testing passageway system providing fluid communication between the testing conduit and at least one of the fittings associated with the at least one communication line;
inserting a testing plug in the testing conduit, the testing plug providing fluid communication between a pressure testing source and the testing passageway system;
injecting pressurized fluid from a pressure testing source, through the testing conduit, through the testing passageway system, and into contact with at least one of the fittings associated with the at least one communication line;
replacing the testing plug with a standard plug that prevents fluid communication between the testing conduit and the well tool exterior but allows fluid communication between the well tool internal bore and the testing conduit passageway; and
deploying the well tool in a wellbore.

23. A method for pressure testing a sealing engagement of fittings associated with at least one communication line disposed in a communication line conduit included in a well tool, the method comprising:
providing a testing conduit and a testing passageway system in the well tool, the testing passageway system providing fluid communication between the testing conduit and at least one of the fittings associated with the at least one communication line;
inserting a first testing plug piece and a rupture disk in the testing conduit, the first testing plug piece providing fluid communication between the pressure testing source and the testing passageway system, the rupture disk initially prohibiting fluid communication between a well tool internal bore and the testing passageway system;
injecting pressurized fluid from a pressure testing source, through the testing conduit, through the testing passageway system, and into contact with at least one of the fittings associated with the at least one communication line;
bursting the rupture disk to provide fluid communication between the well tool internal bore and the testing passageway system;
replacing the testing plug with a standard plug that prevents fluid communication between the testing conduit and the well tool exterior but allows fluid communication between the well tool internal bore and the testing conduit passageway; and
deploying the well tool in a wellbore.

24. The method of claim 23, further comprising after the bursting step, replacing the first testing plug piece with a standard plug that prevents fluid communication between the testing conduit and the well tool exterior.

25. A method for pressure testing a sealing engagement of fittings associated with at least one communication line disposed in a communication line conduit included in a well tool, the method comprising:
providing a testing conduit and a testing passageway system in the well tool, the testing passageway system providing fluid communication between the testing conduit and at least one of the fittings associated with the at least one communication line;
sealingly dividing the communication line conduit into a first space and a second space, the first space being in fluid communication with the testing conduit passageway and with the fittings of the at least one communication line, the second space being in fluid communication with setting ports of the well tool;
preventing fluid communication between the first space and the second space;
inserting a testing plug in the testing conduit, the testing plug providing fluid communication between a pressure testing source and the testing passageway system;
injecting pressurized fluid from the pressure testing source, through the testing conduit, through the testing passageway system, and into contact with at least one of the fittings associated with the at least one communication line;
replacing the testing plug with a standard plug that prevents fluid communication between the testing conduit and the well tool exterior but allows fluid communication between a well tool internal bore and the testing conduit passageway; and
deploying the well tool in a wellbore.

26. The method of claim 25, wherein the sealingly dividing step and the preventing fluid communication step comprise disposing a conduit tubing in each communication line conduit with the corresponding communication line passing therethrough, the conduit tubing being in sealing engagement with its corresponding communication line conduit proximate each of its ends, the first space generally defined between each communication line and its corresponding conduit tubing, and the second space generally defined between each conduit tubing and its corresponding conduit.

27. The method of claim 25, further comprising, after the injecting step, balancing the pressure between the first space and the second space.

28. A system for pressure testing a sealing engagement of fittings associated with a plurality of communication line conduits included in a well tool, each of the plurality of communication line conduits housing a communication line, and the communication line having at least one associated fitting, the system comprising:
a testing conduit defined in the well tool, the well tool adapted to be disposed inside a wellbore;

a testing passageway system defined in the well tool providing fluid communication between the testing conduit and at least one of the fittings associated with the communication line; and a testing plug disposed in the testing conduit providing fluid communication between a pressure testing source and the testing passageway system; wherein the testing passageway system provides fluid communication between the testing conduit and at least one of the fittings associated with each of the plurality of communication line conduits.

29. A system for pressure testing the sealing engagement of the fittings associated with at least one communication line disposed in a communication line conduit included in a well tool, the system comprising:

a testing conduit defined in the well tool;

a conduit tubing provided in each communication line conduit;

each communication line passing within its corresponding conduit tubing;

a first space generally defined between each communication line and its corresponding conduit tubing;

the first space being in fluid communication with the fittings of its corresponding communication line;

a second space generally defined between each conduit tubing and its corresponding communication line conduit;

at least one seal preventing fluid communication between the first space and the second space;

a testing passageway system providing fluid communication between the testing conduit and each of the first spaces; and a testing plug disposed in the testing conduit providing fluid communication between a pressure testing source and the testing passageway system.

30. The system of claim 29, wherein:

each of the communication line conduits is defined through the well tool; and the testing conduit is in fluid communication with the well tool internal bore.

31. The system of claim 29, wherein the testing passageway system comprises:

a testing conduit inlet and a testing duct defined in the well tool;

a conduit port for each communication line conduit defined in the well tool;

the testing conduit inlet providing fluid communication between the testing conduit and the testing duct; and each conduit port providing fluid communication between the first annular space of its corresponding communication line conduit and the testing duct.

32. The system of claim 31, wherein:

each of the communication line conduits is axially defined through the well tool;

the testing conduit is axially defined in the well tool from one of the ends to the well tool internal bore;

the testing conduit inlet extends radially from the testing conduit to the testing duct;

the testing duct is an annular duct defined within the well tool; and each conduit port extends radially from its corresponding communication line conduit to the testing duct.

33. The system of claim 29, wherein:

the testing conduit is axially defined in the well tool and extends to the well tool internal bore;

the testing plug is threadably sealably engaged to the testing conduit;

the testing plug includes a testing plug passageway therethrough providing fluid communication between the pressure testing source and the testing passageway system; and the testing plug includes a testing plug seal prohibiting fluid communication between the pressure testing source and the well tool internal bore.

34. The system of claim 33, wherein the testing plug seal is located intermediate the testing passageway system and the well tool internal bore and sealingly engages the testing conduit.

35. The system of claim 29, further comprising:

a bypass component disposed at each end of each conduit tubing;

the bypass component having at least one sealing mechanism that includes the at least one seal;

each communication line extending through each corresponding bypass component; and each sealing mechanism providing a sealing engagement between the bypass component and the conduit tubing and between the bypass component and the control line conduit.

36. The system of claim 35, wherein each bypass component includes at least one slot providing fluid communication between the testing passageway system and its corresponding first space.

37. The system of claim 29, wherein the first space is pressure balanced with the second space when the well tool is disposed in a wellbore.

38. The system of claim 29, wherein the well tool is a packer.

* * * * *